(12) United States Patent
Fujimura

(10) Patent No.: US 9,651,798 B1
(45) Date of Patent: May 16, 2017

(54) THERMOPLASTIC FILM TO PREVENT EYEGLASSES FROM SLIPPAGE

(71) Applicant: Yasuo Fujimura, Phoenix, AZ (US)

(72) Inventor: Yasuo Fujimura, Phoenix, AZ (US)

( * ) Notice: Subject to any disclaimer, the term of this patent is extended or adjusted under 35 U.S.C. 154(b) by 84 days.

(21) Appl. No.: 14/929,775

(22) Filed: Nov. 2, 2015

(51) Int. Cl.
*G02C 5/12* (2006.01)
*G02C 3/00* (2006.01)
*G02C 5/00* (2006.01)
*G02C 5/14* (2006.01)

(52) U.S. Cl.
CPC .............. *G02C 3/003* (2013.01); *G02C 5/008* (2013.01); *G02C 5/12* (2013.01); *G02C 5/143* (2013.01)

(58) Field of Classification Search
CPC .......... G02C 3/003; G02C 5/008; G02C 5/12; G02C 5/126; G02C 5/128; G02C 5/14; G02C 5/143
USPC .............................. 351/78, 79, 122, 136, 139
See application file for complete search history.

(56) References Cited

U.S. PATENT DOCUMENTS

| 3,043,191 A | * | 7/1962 | Lanski | ................... G02C 5/126 29/20 |
|---|---|---|---|---|
| 4,165,925 A | | 8/1979 | Donovan | |
| 4,251,302 A | | 2/1981 | Leonard et al. | |
| 4,747,681 A | | 5/1988 | Brower | |
| 4,964,716 A | | 10/1990 | Combs | |
| 6,065,834 A | | 5/2000 | Willhite | |

FOREIGN PATENT DOCUMENTS

JP 2004-109659 * 4/2004 ............... G02C 5/12

* cited by examiner

*Primary Examiner* — Huy K Mai
(74) *Attorney, Agent, or Firm* — Morgan Law Offices, PLC

(57) ABSTRACT

A thermoplastic film that can be applied to various skin-engaging portions (e.g., the nose pads and/or earpieces) of a pair of eyeglasses to prevent slippage of the eyeglasses. The thermoplastic film comprises a composition that reacts to the wearer's body heat to become sticky. The resultant bond with the wearer's skin is sufficiently strong so as to prevent the pair of eyeglasses from slipping due to sudden movement, and is resistant to perspiration, oil or the like.

20 Claims, 1 Drawing Sheet

THERMOPLASTIC FILM TO PREVENT EYEGLASSES FROM SLIPPAGE

BACKGROUND OF THE INVENTION

1. Field of the Invention

The present invention relates to a thermoplastic film and a method of applying the thermoplastic film to skin-engaging portions of a pair of eyeglasses to prevent the pair of eyeglasses from slippage.

2. Description of the Related Art

It is well recognized that slippage of eyeglasses can be troubling. This problem is aggravated when the wearer engages in vigorous activity such as sports or physical work. Various attempts have been made to address this problem. Examples of products that purport to prevent slippage include various nose pad attachments having a friction enhancing coating. Such nose pad attachments may increase friction to some extent. However, when the eyeglasses are slid forward by sudden movement of the wearer's head, the attachments tend to lose contact with the skin and hence the necessary friction to retain the pair of eyeglasses in place is no longer provided. The same loss occurs by upward and downward movement from the earpieces. Moreover, perspiration and/or skin oil further weakens the effects of the nose pad attachments. Additionally, clip-on silicone covers for nose-pads sold in the current marketplace have similar problems mentioned above, and also tend to change the optimum alignment of the lenses by its significant thickness.

SUMMARY OF THE INVENTION

One aspect of the disclosure relates to a thin thermoplastic film that can be applied to various skin-engaging portions (e.g., the nose pads and/or earpieces) of a pair of eyeglasses to prevent slippage of the eyeglasses. The thermoplastic film comprises a composition that reacts to the wearer's body heat to become sticky. The resultant bond with the wearer's skin is sufficiently strong so as to prevent the pair of eyeglasses from slipping due to sudden movement, and is resistant to perspiration, oil or the like.

The thermoplastic film can be easily cut by tearing off pieces of the thermoplastic film with fingers or the like. The thermoplastic film may be stretched to cover the entire skin-engaging area, if necessary. In an embodiment, the thermoplastic film is supplied as strips of which the width ranges between about 0.2 inches to 0.4 inches and the length ranges between about 2 inches and 5 inches, for example. Each strip can be individually wrapped with a paper. In another embodiment, the thermoplastic film is supplied as a tape with a uniform width. The tape can be wound around a roll encased in a plastic cover with a cutter, for example. In still another embodiment, the thermoplastic film is provided as pre-cut pieces with a predefined shape, such as an oval. The width can be from about 0.2 inches to 0.4 inches, and the length from about 0.2 inches to 0.6 inches, for example.

The thermoplastic film will preferably include a gum base made of a blend of polymers used in chewing gum bases and specified by the Food and Drug Administration. In an embodiment, the thermoplastic film 22 comprises a blend of polyolefin-type materials and wax. In an embodiment, the composition can include polyisobutylene (approximately 35% by weight), polyethylene (approximately 15% by weight), and paraffin wax (approximately 50% by weight). The average molecular weight of these polymers are: polyisobutylene (approximately 1,410,000), polyethylene (approximately 31,000), and paraffin wax (approximately 408) respectively. An antioxidant such as butylated hydroxytoluene (approximately <0.1% by weight) may be added to extend shelf-life. The thickness of the thermoplastic film may be approximately 0.001 to 0.010 inches for durability and user comfort, and so as not to interfere with the alignment of the lenses.

DETAILED DESCRIPTION OF THE INVENTION

Figure 1:
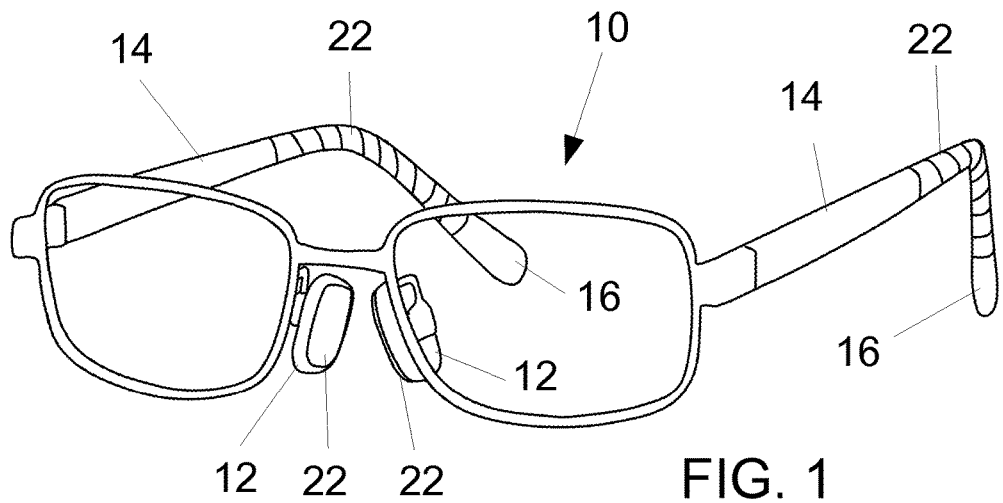
FIG. 1 is a perspective view of a pair of eyeglasses having a thermoplastic film attached to prevent slippage.

FIG. 1 is a perspective view of a pair of eyeglasses 10 having a thermoplastic film 22 attached to several skin-engaging portions thereof. In particular, the thermoplastic film 22 is applied to each of a pair of nose pads 12 and earpieces 16. As will be described in greater detail, the thermoplastic film 22 comprises a composition that reacts to the wearer's body heat to become sticky. The resultant bond with the wearer's skin is sufficiently strong so as to prevent the pair of eyeglasses 10 from slipping due to sudden movement, and is resistant to perspiration, oil or the like.

As illustrated, the pair of nose pads 12 each has a front facing that s extend from the frame with a nose pad stem. The thermoplastic film 22 is disposed on the front facing of each of the pair of the nose pads 12. The thermoplastic film 22 may further or alternatively be wrapped around the front facing of each of the pair of nose pads 12. Although the illustrated embodiment shows the thermoplastic film 22 applied onto each of the pair of nose pads 12, certain types of frames include a nose support integrated into the frame rather than have nose pads 12 of the type shown. In this case, the thermoplastic film 22 may be placed on the nose support.

Advantageously, the thermoplastic film 22 can be easily cut by tearing off pieces of the thermoplastic film 22 with fingers or the like. The thermoplastic film 22 may be stretched to cover the entire skin-engaging area, if necessary. In an embodiment, the thermoplastic film is supplied as strips of which the width ranges between about 0.2 inches to 0.4 inches and the length ranges between about 2 inches and 5 inches, for example. Each strip can be individually wrapped with a paper. In another embodiment, the thermoplastic film 22 is supplied as a tape with a uniform width. The tape can be wound around a roll encased in a plastic cover with a cutter, for example. In still another embodiment, the thermoplastic film 22 is provided as pre-cut pieces with a predefined shape, such as an oval. The width can be from about 0.2 inches to 0.4 inches, and the length from about 0.2 inches to 0.6 inches, for example.

As mentioned, once the thermoplastic film 22 comes into contact with the surface of the wearer's skin, the thermoplastic film 100, with the help of the user's body heat, starts to adhere to the user's skin. The adherence strength of the thermoplastic film 22 is enough to prevent forward-sliding of the eyeglasses 10 by sudden movement of a wearer's head. Unlike conventional pressure-sensitive adhesives, the adherence strength of the thermoplastic film 22 will not be weakened significantly by perspiration or skin oil. Furthermore, repetitive wearing and removing of the eyeglasses 10 does not weaken significantly the adherence strength of the thermoplastic film 100.

Covering each of the pair of nose pads 12 by the thermoplastic film 22 may suffice to hold the pair of eyeglasses 10 in a proper position in mild daily use such as sedentary work. However, when rigorous activity such as sports or strenuous work may be expected, covering each earpiece 16 with the thermoplastic film 22 provides additional support. The thermoplastic film section 120 may be wound around each earpiece 16 (as shown) or otherwise applied. In general, the thermoplastic film 22 can be placed onto any skin-engaging portion of the eyeglasses 110. Other areas where the thermoplastic film 22 can be applied include under the frame to bond with the wearer's forehead and on portions of the temples 14 other than the earpiece 16, etc.

The thermoplastic film 22 will preferably include a gum base made of a blend of polymers used in chewing gum bases and specified by the Food and Drug Administration. In an embodiment, the thermoplastic film 22 comprises a blend of polyolefin-type materials and wax. In an embodiment, the composition can include polyisobutylene (approximately 35% by weight), polyethylene (approximately 15% by weight), and paraffin wax (approximately 50% by weight). The average molecular weight of these polymers are: polyisobutylene (approximately 1,410,000), polyethylene (approximately 31,000), and paraffin wax (approximately 408) respectively. An antioxidant such as butylated hydroxytoluene (approximately <0.1% by weight) may be added to extend shelf-life. The thermoplastic film 100 bears better characteristics for handling than usual gum bases so that removal from the skin-engaging surface is much easier after use. The thickness of the thermoplastic film may be approximately 0.001 to 0.010 inches for durability and user comfort, and so as not to interfere with the alignment of the lenses. In an embodiment, Parafilm M™ may be used for the thermoplastic film 120.

Figure 2:
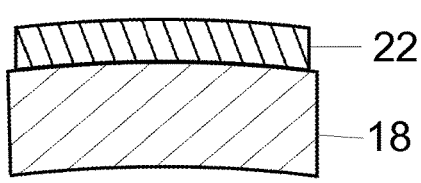
FIG. 2 is an enlarged, cross-sectional view showing the thermoplastic film attached without adhesive, according to a first embodiment.

FIG. 2 is an enlarged, cross-sectional view showing the thermoplastic film 22 attached to a skin-engaging portion 18 of the eyeglasses 10 without adhesive. Without the help of an adhesive, the thermoplastic film 22 is applied using light pressure from a user's finger or the like. The thermoplastic film 22 may be removed simply by peeling off without using a solvent.

Figure 3:
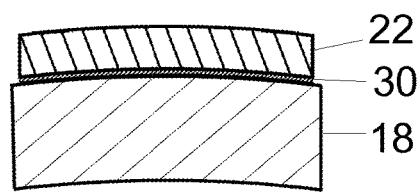
FIG. 3 is a cross-sectional view showing the thermoplastic film coated with a pressure-sensitive adhesive, according to a second embodiment.

FIG. 3 is a cross-sectional view showing the thermoplastic film 22 coated with a pressure-sensitive adhesive 30 onto the skin-engaging portion 18. The pressure-sensitive adhesive 30 may be initially covered by a protective layer (not shown) that can be peeled away to expose the pressure-sensitive adhesive 30. The thermoplastic film 22 is applied using light pressure from a user's finger or the like. The thermoplastic film 22 may be removed simply by peeling off without using a solvent.

Figure 4:
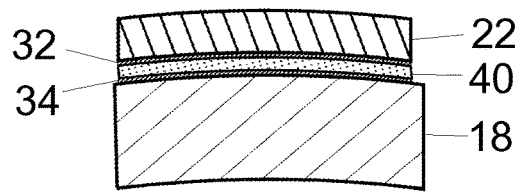
FIG. 4 is a cross-sectional view showing a thermoplastic film with a substrate having a pressure-sensitive adhesive on both sides.

FIG. 4 is a cross-sectional view showing the thermoplastic film 22 being applied using a double-sided pressure sensitive adhesive comprising a substrate 40 having a first pressure-sensitive adhesive 32 on a first substrate side and a second pressure-sensitive adhesive 34 on a second substrate side opposite the first substrate side. Each pressure-sensitive adhesive 32, 34 may be initially covered by a protective layer (not shown), which can be peeled away to expose the pressure-sensitive adhesive 32, 34. With the help of the double-sided pressure sensitive adhesive, the thermoplastic film 22 is applied s using light pressure from a user's finger or the like. The thermoplastic film 22 may be removed simply by peeling off without using a solvent.

While this invention has been described in conjunction with the various exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A thermoplastic film applied to a pair of eyeglasses to prevent the pair of eyeglasses from slippage, comprising:
   the thermoplastic film disposed on a plurality of skin-engaging portions of a pair of the eyeglasses;
   wherein the thermoplastic film becomes sticky and a bond with a wearer's skin is substantially strengthened as a result of heat transfer from the wearer's skin.

2. The thermoplastic film according to claim 1, wherein the skin-engaging portions include nose pads.

3. The thermoplastic film according to claim 1, wherein the skin-engaging portions include earpieces.

4. The thermoplastic film according to claim 1, wherein the thermoplastic film is about 0.001 (25.4 µm) to 0.010 inches (254 µm) in thickness.

5. The thermoplastic film according to claim 1, wherein the thermoplastic film is one or more strip.

6. The thermoplastic film according to claim 1, wherein the thermoplastic film is cut into pieces having predefined shapes, each of the pieces for application to a corresponding skin-engaging portion.

7. The thermoplastic film according to claim 6, wherein the predefined shapes include an oval shape.

8. The thermoplastic film according to claim 1, wherein the thermoplastic film is obtained from a roll of thermoplastic film.

9. The thermoplastic film according to claim 1, wherein the thermoplastic film is applied without the help of an additional adhesive.

10. The thermoplastic film according to claim 1, wherein the thermoplastic film is removable by peeling off without a solvent.

11. The thermoplastic film according to claim 1, wherein the thermoplastic film is coated with a pressure-sensitive adhesive, the pressure-sensitive adhesive for attachment of the thermoplastic film to the skin-engaging portions.

12. The thermoplastic film according to claim 1, wherein the thermoplastic film includes a gum base.

13. The thermoplastic film according to claim 1, wherein the thermoplastic film is a blend of polyolefin-type materials and wax.

14. The thermoplastic film according to claim 13, wherein the thermoplastic film is a blend of polyisobutylene, polyethylene, and paraffin wax.

15. A thermoplastic film to prevent a pair of eyeglasses from slippage, comprising:
   a first thermoplastic film section disposed on a first one of a pair of nose pads; and
   a second thermoplastic film section disposed on a second one of the pair of the nose pads;
   wherein the first thermoplastic film section and the second thermoplastic film section becomes sticky and a bond with a wearer's skin is substantially strengthened as a result of heat transfer from the wearer's skin.

16. The thermoplastic film according to claim 15, wherein the thermoplastic film includes a gum base.

17. The thermoplastic film according to claim 15, wherein the thermoplastic film is a blend of polyolefin-type materials and wax.

18. The thermoplastic film according to claim 17, wherein the thermoplastic film is a blend of polyisobutylene, polyethylene, and paraffin wax.

19. A method of preventing a pair of eyeglasses from slippage, comprising:
  applying a thermoplastic film to a plurality of skin-engaging portions of the pair of eyeglasses; and
  transferring heat from a wearer's skin to the thermoplastic film such that the thermoplastic film becomes sticky and a bond with a wearer's skin is substantially strengthened.

20. The thermoplastic film according to claim 19, wherein the thermoplastic film is a blend of polyolefin-type materials and wax.

\* \* \* \* \*